Sept. 14, 1926.  W. L. RUTKOWSKI  1,600,196
SPOOL
Filed July 17, 1922  2 Sheets-Sheet 1

Inventor:
Walter L. Rutkowski.
By Fred J. Harson
Attorney.

Sept. 14, 1926.  W. L. RUTKOWSKI  1,600,196

SPOOL

Filed July 17, 1922   2 Sheets-Sheet 2

Inventor:
Walter L. Rutkowski.
By Fred'k J. Harson
Attorney.

Patented Sept. 14, 1926.

1,600,196

UNITED STATES PATENT OFFICE.

WALTER L. RUTKOWSKI, OF ST. LOUIS, MISSOURI, ASSIGNOR TO R. C. CAN COMPANY, OF ST. LOUIS, MISSOURI, A CORPORATION OF MISSOURI.

SPOOL.

Application filed July 17, 1922. Serial No. 575,652.

My invention relates to spools, and more particularly to spools made from fiber, such as pasteboard, and, is a distinct and practical improvement to overcome certain practical objections to, and defects in, spool construction of the same class.

The object of my present invention is to provide a spool, which will be simple and comparatively inexpensive in construction, durable and highly efficient for the purpose intended.

A further object of the invention is to provide a spool having a fiber tube member, fiber end disks and metallic end means to prevent the end disks from being removed from the tube member after the spool has been assembled.

A still further object of the invention is to provide means to prevent the end disks moving toward each other after the spool is assembled.

A still further object of the invention is to provide end means which has a flange embedded into the tube by a rolling in process for securely applying same to the ends of the tube.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
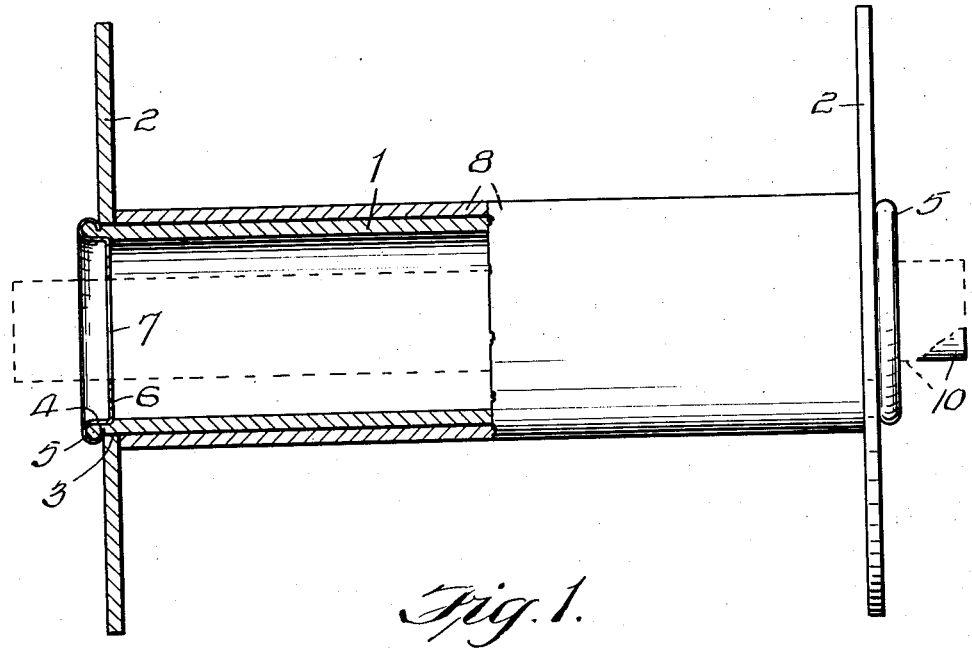
Fig. 1, is a view partly in section and partly in elevation of a spool embodying my invention.
Figures 2, 3:
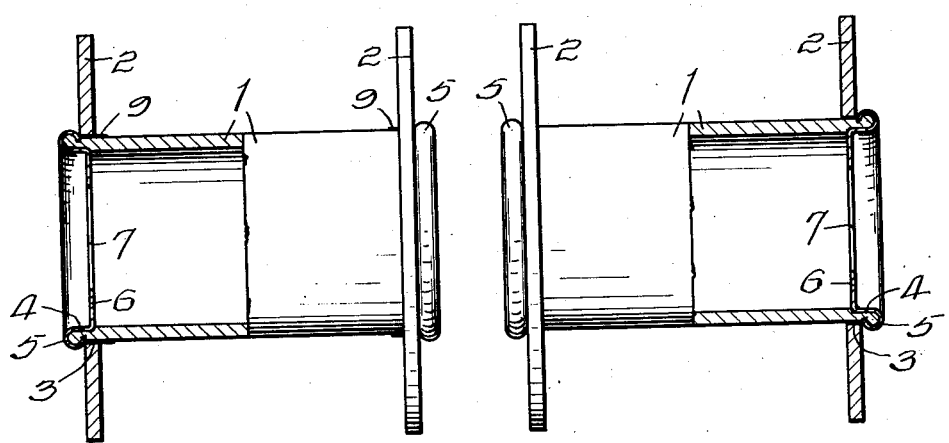
Fig. 2, is a view similar to Fig. 1, but showing adhesive means for securing the end disks to the tube to prevent inward movement thereof.
Fig. 3, is also a view similar to Fig. 2, showing the end disks free to move toward each other upon the tube.
Figure 5:
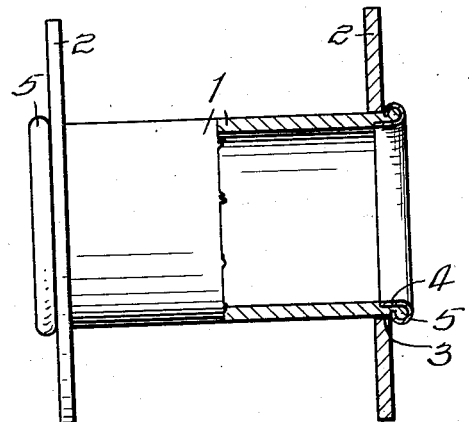
Fig. 5, is a view similar to Fig. 4, showing the metallic end pieces for the tube in the form of a ring.
Figure 6:
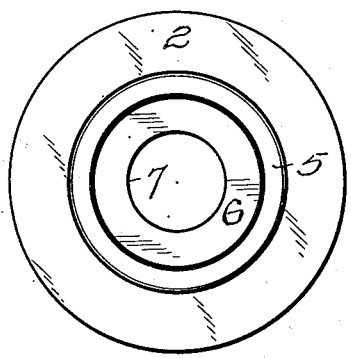
Figure 7:
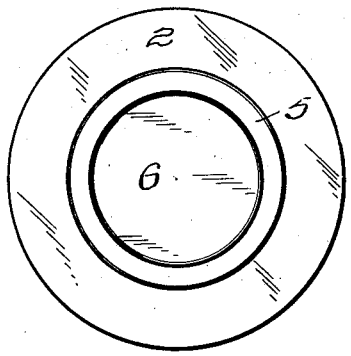
Figure 8:
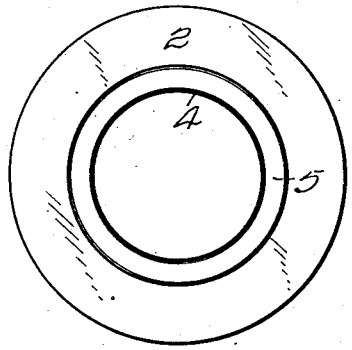
Figures 9, 10, 11:
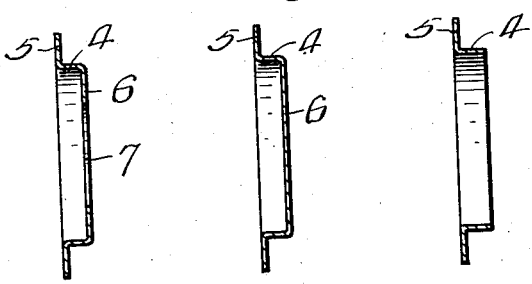

Fig. 6, is an end view of Figs. 1, 2 and 3.
Fig. 7, is an end view of Fig. 4.
Fig. 8, is an end view of Fig 5.
Fig 9, is a sectional view of the metallic end piece shown in Figs. 1, 2 and 3 before it is applied to the tube.
Fig. 10, is a sectional view of the metallic end piece shown in Fig. 4 before it is applied to a tube.
Fig. 11, is a sectional view of a metallic end piece before it is applied to the tube.

Referring to the drawing, the spool construction comprises a fiber tube 1 which may be cylindrical in form, or of any other desired shape, as is manifest, and the end disks 2 which are each provided with a central opening 3 to permit mounting of the disks upon the tube. These disks 2 while they are illustrated as circular in shape, may be of any desired shape.

The devices applied to the ends of the tube to prevent the disks from working off of the tube or being removed therefrom, each comprise a metallic ring like wall 4 terminating at one end in a right angular flange 5 before it is applied to the tube and at its opposite end in a plate 6 lying parallel with the flange 5 and provided with a suitably shaped opening 7.

The ring like wall 4 of the end piece is receivable within the end of the tube and snugly fits into the end of the tube. After the disks are mounted upon the tube, the end pieces are applied and the ring like wall 4 is rolled or pressed outwardly into the tube material and at the same time the flange 5 is rolled into the peripheral face of the tube material thereby firmly locking the metallic end pieces to the ends of the tube and thereby providing a rolled flange of a greater diameter than the tube to prevent the end fiber disks from being removed from the tube.

In Figure 1, I have shown the use of a second tube designated 8, which is mounted upon tube 1 between the end fiber disks 2 to prevent the disks from moving toward each other after the spool has been assembled.

In Figure 2, I have shown the use of a suitable adhesive 9 for holding the end fiber disks 3 inwardly in lieu of the tube 8.

Figure 4:
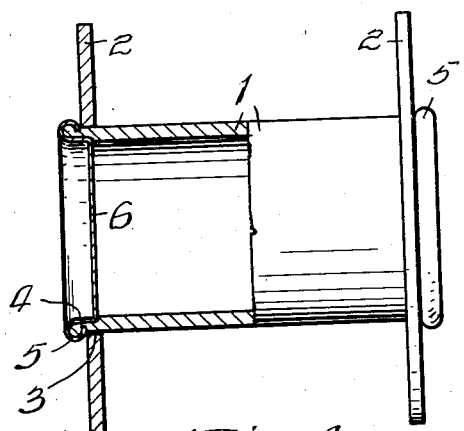
Fig. 4, is a view similar to Figs. 1, 2 and 3, but showing my metallic end pieces for the tube which are not provided with an opening.

In Figures 3, 4 and 5, I do not employ any means for holding or locking the fiber end disks in their separated positions relying entirely upon the frictional contact of the disks with the peripheral surface of the tube which is sufficient to resist ordinary pressure thereagainst.

I have shown in dotted lines in Fig. 1, a spindle, designated 10, which is receivable in the openings of the metallic end pieces for supporting the spool when desired.

It is evident from the foregoing description that I provide a spool which may be employed for winding wire upon or any thing else that must be wound upon a spool, that the spool is durable, easily and cheaply manufactured, neat in appearance and light in weight to the proportion of strength thereof.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications, as may fairly fall within the scope of the appended claims when fairly construed.

What I claim is:

1. In a spool construction, in combination, a tubular body, end disks for said tube and a device having a peripheral edge fixed to each end of the tubular body by rolling the peripheral edge of the device into engagement with the tubular body to provide a rolled flange to prevent removal of the end disks from the tubular body.

2. In a spool construction, in combination, a tubular body portion, end disks for said tube, a device having a peripheral edge fixed to each end of the tubular body portion by rolling the peripheral edge of the device into the tubular body portion to provide a bead to prevent removal of the end disks from the tubular body portion and a tube mounted upon said tubular body portion intermediate the end disks with its ends engaging the inner faces of the disks to prevent movement of the disks toward each other.

3. In a spool construction, in combination, a tubular body, end disks each having a central opening mounted upon said tube, a device for each end of the tube having a peripheral edge, said peripheral edges being rolled into embedded engagement with the tubular body to prevent removal of the disks from the tubular body and means intermediate the disks engaging the inner face of each disk and the peripheral face of the tube to prevent longitudinal displacement of the end disk upon the tubular body.

4. In a spool construction, in combination, a tubular body, end disks mounted upon said tube, a device having a peripheral edge rolled into embedded engagement with the tubular body to prevent outward displacement of the disks upon the tubular body and intermediate means mounted on the tubular body between the disks to prevent inward displacement of the disks upon the tubular body but permitting the disks to be rotatably mounted thereon.

5. In a spool construction, in combination, a tubular body portion, end disks for said tube and a device having a flange rolled into the peripheral face of the tubular body portion and a wall brought into frictional contact with the inner face of the tubular body portion to prevent removal of the end disks from the tubular body portion.

6. In a spool construction, in combination, a fiber tube, fiber end disks mounted upon said tube and a disked metallic end piece frictionally seated within each end of the tube and having a flange at its outer edge, said flange being in rolled embedded engagement with the peripheral surface of the tube to provide a positive lock against the outward longitudinal movement of the fiber end disks.

7. In a spool construction, in combination, a fiber tube, fiber end disks mounted upon said tube, a disked metallic end piece frictionally seated within each end of the tube and having a flange at its outer edge, said flanges being in rolled embedded engagement with peripheral surface of the tube to provide a positive lock against the outward displacement of the fiber end disks, said disked metallic end pieces each having a central opening therein to permit mounting of the spool upon a spindle.

8. In a spool construction, a fiber tube, a pair of circular shaped disks each having a central opening mounted upon said tube, a metallic dished disk frictionally receivable in each end of the tube, a flange for each disk, the peripheral edges of which are rolled into embedded engagement with the fiber tube to provide enlarged ends to prevent the circular shaped disks against outward displacement upon the tube.

9. In a spool construction, a tubular fiber body of the same diameter throughout its length, a pair of fiber disks mounted upon said tube, metallic end pieces each having a flange, the flange edge of each metallic end piece being rolled into embedded engagement with the outer face of the tubular body to provide enlarged outer diameters for the ends of the tubular body and prevent removal of the disks from the tubular body, said metallic end pieces each having a body portion for engagement with the inner face of the tube and said body portion being connected with a disk section.

10. In a spool construction, a tubular fiber body, metallic end pieces each having a flange, the peripheral edge of which flanges are in rolled embedded engagement with the peripheral face of the tubular body, each end piece having a wall in frictional contact with the inner face of the tubular body, a pair of disks mounted upon said tubular body, means mounted upon said tube between said disks, outward displacement of said disks upon said tubular body being prohibited by the rolled flanged edges of the metallic end pieces and inward displacement of said disks being prohibited by the means mounted upon the tube between the disks.

11. In a spool construction, in combination, a tubular body portion, end disks for said tube, metallic end pieces for each end of the tube, each end piece having a flange, the peripheral edge of which is rolled into the peripheral face of the tubular body portion for locking the end pieces to the ends of the tubular body portion for preventing the removal of the end disks from the tubular body portion.

12. In a spool construction, in combination, a fiber tube, a pair of fiber disks carried by the tube, a metallic ring like member frictionally receivable within each end of the tube, said ring like members each having an outwardly directed flange in rolled embedded engagement with the tube to provide a positive lock against removal of the fiber end disks from the tube.

13. In a spool construction, a fiber tube, a pair of circular shaped disks each having a central opening mounted upon said tube, a metallic dished disk having a central opening frictionally receivable in each end of the tube for mounting upon a supporting member, a flange for each disk, the peripheral edges of which are rolled into embedded engagement with the fiber tube to provide enlarged ends to prevent the circular shaped disks against outward displacement upon the tube.

In testimony whereof, I have hereunto signed my name to the specification.

WALTER L. RUTKOWSKI.